US007183350B2

(12) United States Patent
Balfour et al.

(10) Patent No.: US 7,183,350 B2
(45) Date of Patent: *Feb. 27, 2007

(54) POLY(ARYLENE ETHER) BLENDS HAVING LOW MELT VISCOSITY IN THE ABSENCE OF PLASTICIZER

(75) Inventors: Kim Balfour, Delanson, NY (US); Hua Guo, Selkirk, NY (US); Michael Murray, Downingtown, PA (US)

(73) Assignee: General Electric Company, Schenectady, NY (US)

( * ) Notice: Subject to any disclaimer, the term of this patent is extended or adjusted under 35 U.S.C. 154(b) by 343 days.

This patent is subject to a terminal disclaimer.

(21) Appl. No.: 10/777,436

(22) Filed: Feb. 12, 2004

(65) Prior Publication Data

US 2004/0171733 A1    Sep. 2, 2004

Related U.S. Application Data

(60) Provisional application No. 60/319,980, filed on Feb. 28, 2003.

(51) Int. Cl.
*C08K 3/40* (2006.01)
*C08K 3/04* (2006.01)
*C08K 71/12* (2006.01)

(52) U.S. Cl. .................. 524/494; 524/495; 525/390
(58) Field of Classification Search ................ 524/494, 524/495; 525/390
See application file for complete search history.

(56) References Cited

U.S. PATENT DOCUMENTS

| 2,933,480 A | 4/1960 | Gresham |
|---|---|---|
| 3,093,621 A | 6/1963 | Gladding |
| 3,211,709 A | 10/1965 | Adamek et al. |
| 3,257,357 A | 6/1966 | Stamatoff |
| 3,257,358 A | 6/1966 | Stamatoff |
| 3,306,874 A | 2/1967 | Hay |
| 3,306,875 A | 2/1967 | Hay |
| 3,646,168 A | 2/1972 | Barrett |
| 3,790,519 A | 2/1974 | Wahlborg |
| 3,884,993 A | 5/1975 | Gros |
| 3,894,999 A | 7/1975 | Boozer, et al. |
| 3,914,266 A | 10/1975 | Hay |
| 4,028,341 A | 6/1977 | Hay |
| 4,059,654 A | 11/1977 | Von Bodungen et al. |
| 4,097,550 A | 6/1978 | Haaf et al. |
| 4,154,712 A | 5/1979 | Lee, Jr. |
| 4,166,055 A | 8/1979 | Lee, Jr. |
| 4,584,334 A | 4/1986 | Lee, Jr. et al. |
| 4,692,482 A | 9/1987 | Lohrengel |
| 4,806,297 A | 2/1989 | Brown et al. |
| 4,806,602 A | 2/1989 | White et al. |
| 4,816,510 A | 3/1989 | Yates, III |
| 4,935,472 A | 6/1990 | Brown et al. |
| 5,019,610 A | 5/1991 | Avakian |
| 5,081,185 A | 1/1992 | Haaf et al. |
| 5,089,562 A * | 2/1992 | van de Meer et al. ...... 525/132 |
| 5,089,566 A | 2/1992 | Brown et al. |
| 5,204,410 A | 4/1993 | Baneviius et al. |
| 5,218,030 A * | 6/1993 | Katayose et al. ........... 524/371 |
| 5,231,146 A | 7/1993 | Brown et al. |
| 5,237,005 A | 8/1993 | Yates, III |
| 5,256,250 A | 10/1993 | Pelzer |
| 5,258,455 A | 11/1993 | Laughner et al. |
| 5,290,881 A | 3/1994 | Dekkers |
| 5,294,654 A | 3/1994 | Hellstern-Burell |
| 5,376,724 A | 12/1994 | Bailly et al. |
| 5,419,810 A | 5/1995 | Van Der Piepen et al. |
| 5,461,096 A | 10/1995 | Bopp et al. |
| 5,859,130 A | 1/1999 | Gianchandai et al. |
| 5,880,221 A | 3/1999 | Liska |
| 5,916,970 A | 6/1999 | Lee, Jr. et al. |
| 5,981,656 A | 11/1999 | McGaughan et al. |
| 6,211,327 B1 | 4/2001 | Braat |
| 6,576,700 B2 | 6/2003 | Patel |
| 2001/0053820 A1* | 12/2001 | Yeager et al. ................ 525/186 |
| 2003/0023006 A1 | 1/2003 | Patel ........................... 525/390 |
| 2004/0106750 A1* | 6/2004 | Yeager et al. ................ 525/502 |

FOREIGN PATENT DOCUMENTS

| EP | 0363578 | 4/1990 |
|---|---|---|
| EP | 0401690 | 12/1990 |
| WO | WO 01/79351 | 10/2001 |

OTHER PUBLICATIONS

Chapter 3 of Organic Polymer Chemistry, 2nd Edition, K.G. Saunders, Chapman and Hall, 1988.
JP 11012354 Publication Date Jan. 19, 1999 (Abstract Only).

* cited by examiner

*Primary Examiner*—Vasu Jagannathan
*Assistant Examiner*—Sandra Poulos
(74) *Attorney, Agent, or Firm*—Cantor Colburn LLP

(57) ABSTRACT

A poly(arylene ether) composition comprises a first poly (arylene ether) resin having an intrinsic viscosity greater than or equal to about 0.3 dl/g, as measured in chloroform at 25° C. and a second viscosity poly(arylene ether) resin having an intrinsic viscosity less than or equal to about 0.17 dl/g, as measured in chloroform at 25° C. wherein the composition is essentially free of plasticizers.

19 Claims, 5 Drawing Sheets

POLY(ARYLENE ETHER) BLENDS HAVING LOW MELT VISCOSITY IN THE ABSENCE OF PLASTICIZER

CROSS REFERENCE TO RELATED APPLICATIONS

The application claims priority to U.S. Provisional Application Ser. No. 60/319,980 filed on Feb. 28, 2003, which is incorporated by reference herein.

BACKGROUND OF INVENTION

This disclosure relates to poly(arylene ether) compositions with a combination of low melt viscosity and high heat deflection temperature.

Poly(arylene ether) resins are an extremely useful class of high performance engineering thermoplastics by reason of their hydrolytic stability, high dimensional stability, toughness, heat resistance and dielectric properties. They also exhibit good mechanical performance and high glass transition temperature values, typically in the range of 150° to 210° C. This unique combination of properties renders poly(arylene ether) based compositions suitable for a broad range of applications. Poly(arylene ether) polymers typically have relatively high molecular weights and possess high melt viscosity with intrinsic viscosity values typically greater than about 0.3 dl/g, as measured in chloroform at 25° C.

It is desirable to improve the melt viscosity capability of poly(arylene ether) compositions. Melt viscosity capability is the ability of a composition to flow freely at elevated temperatures during various processing stages such as extrusion and molding. The melt viscosity can impact the size and type of part that can be prepared with the composition. It has been suggested to improve the melt viscosity of poly(arylene ether) compositions by decreasing the molecular weight of the poly(arylene ether) polymers; however, lower molecular weight sometimes adversely affects other properties such as impact strength. Alternatively, poly(arylene ether) compositions are often prepared with flow promoters or plasticizers such as polystyrene, particularly crystal polystyrene, saturated polyalicyclic resins and terpene phenol to impart high flow to the resulting composition. Polystyrene, terpene phenol and other such flow promoters reduce the heat deflection temperature (HDT) of the product. Additionally, some flame retardants also act as plasticizers and increase the melt viscosity capability.

Efforts to improve the flow characteristics of poly(arylene ether) resins with minimal or no loss of HDT values and impact properties have been made. One approach calls for the addition of a resinous additive comprising vinyl aromatic monomers or a hydrocarbon containing at least 35 weight percent (wt %) aromatic units.

Other approaches have included compositions comprising a blend of two or more poly(arylene ether) resins with one resin having a high intrinsic viscosity values and the other having low intrinsic viscosity. While these approaches have been promising, they have been primarily directed to compositions containing significant amounts of flame retardant and/or plasticizer which has impacts the heat deflection temperature.

SUMMARY OF INVENTION

A poly(arylene ether) composition comprises a first poly(arylene ether) resin having an intrinsic viscosity greater than or equal to about 0.3 dl/g, as measured in chloroform at 25° C. and a second viscosity poly(arylene ether) resin having an intrinsic viscosity less than or equal to about 0.17 dl/g, as measured in chloroform at 25° C. wherein the composition is essentially free of plasticizers.

In another embodiment a poly(arylene ether) composition consists essentially of a first poly(arylene ether) resin having an intrinsic viscosity greater than or equal to about 0.3 dl/g, as measured in chloroform at 25° C. and a second viscosity poly(arylene ether) resin having an intrinsic viscosity less than or equal to about 0.17 dl/g, as measured in chloroform at 25° C.

DETAILED DESCRIPTION

Figure 1:
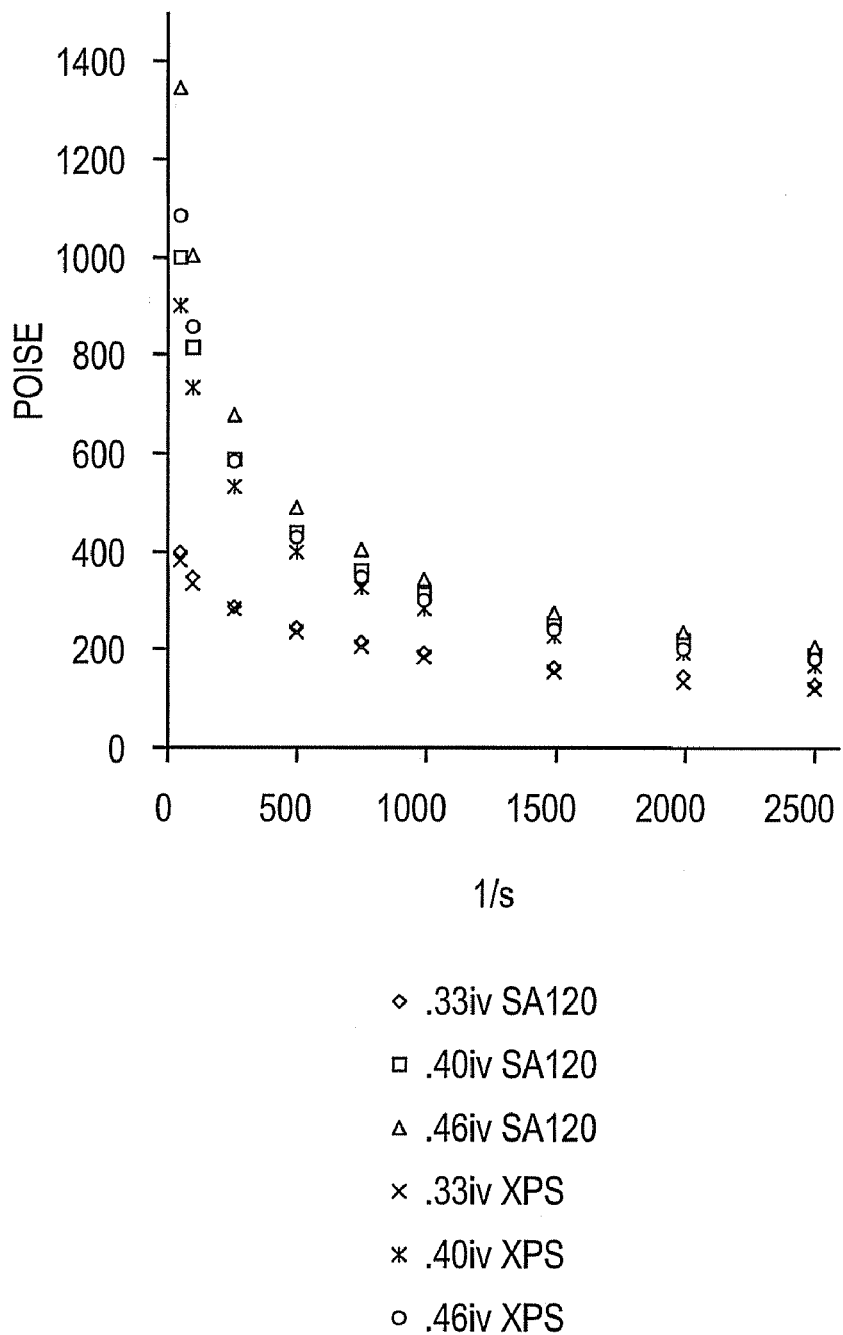
FIG. 1 is a graph depicting melt viscosity data.

A poly(arylene ether) composition comprises a first poly(arylene ether) resin having an intrinsic viscosity greater than or equal to about 0.3 dl/g, as measured in chloroform at 25° C. and a second poly(arylene ether) resin having an intrinsic viscosity less than or equal to about 0.17 dl/g, as measured in chloroform at 25° C. wherein the composition is essentially free of plasticizers. "Essentially free" is herein defined as containing less than about 1 weight percent (wt %), preferably less than about 0.5 wt % and more preferably 0 wt % plasticizers, wherein the amount of plasticizer is based on the total weight of the composition.

The poly(arylene ether) composition described herein, has a heretofore unknown combination of low melt viscosity and a high heat deflection temperature.

The composition in the absence of filler typically exhibits a melt viscosity at 1500 seconds$^{-1}$ and a temperature of 320° C. of less than or equal to about 190, preferably less than or equal to about 180, and more preferably less than or equal to about 170 Pascals-seconds as determined by multipoint capillary rheometry. The composition in the presence of filler typically exhibits a melt viscosity at 1500 seconds$^{-1}$ and a temperature of 320° C. of less than or equal to about 270, preferably less than or equal to about 250, and more preferably less than or equal to about 230 Pascals-seconds as determined by multipoint capillary rheometry.

The composition in the presence or absence of filler has a heat deflection temperature at 264 pounds per square inch (psi) greater than or equal to about 130° C., preferably greater than or equal to about 140° C., more preferably greater than or equal to about 150° C., and most preferably greater than or equal to about 165° C. as determined by ASTM D648. The combination of low melt viscosity and high heat deflection temperature have previously not been available in poly(arylene ether) compositions. Previous low melt viscosity poly(arylene ether) compositions have employed a plasticizer which has limited the heat deflection temperature.

The composition may also exhibit a dissipation factor, measured according to ASTM D150 at 25° C. and 1 kilohertz or 10 kilohertz or 100 kilohertz or 1 megahertz, of less than or equal to about 0.02, preferably less than or equal to about 0.01, more preferably less than or equal to about 0.005. In one embodiment, the cured composition exhibits dissipation factors, measured according to ASTM D150 at 25° C., of less than or equal to 0.005 at each of 1 kilohertz, 10 kilohertz, 100 kilohertz, and 1 megahertz.

The composition may also exhibit an improved dielectric strength, measured according to ASTM D149. For example, a composition comprising 90 weight percent poly(arylene ether) having an intrinsic viscosity of 0.4 dl/g as measured in chloroform at 25° C. and 10 weight percent poly(arylene ether) having an intrinsic viscosity of 0.12 dl/g as measured in chloroform at 25° C. has a mean dielectric strength value of 28 kilovolts per millimeter (kv/mm) with standard deviation of 2.02 kv/mm. For comparison, a composition comprising 90 weight percent poly(arylene ether) having an intrinsic viscosity of 0.4 dl/g as measured in chloroform at 25° C. and 10 weight percent polystyrene has a mean dielectric strength value of 25.6 kv/mm with standard deviation of 1.37 kv/mm. Weight percent for the tested composition was based on the total weight of the composition.

The term poly(arylene ether) includes polyphenylene ether (PPE) and poly(arylene ether) copolymers; graft copolymers; poly(arylene ether) ether ionomers; and block copolymers of alkenyl aromatic compounds, vinyl aromatic compounds, and poly(arylene ether), and the like; and combinations comprising at least one of the foregoing; and the like. Poly(arylene ether)s per se, are known polymers comprising a plurality of structural units of the formula (I):

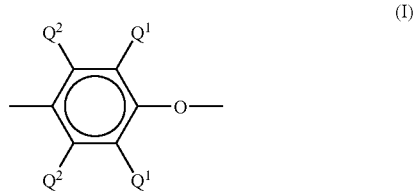

(I)

wherein for each structural unit, each $Q^1$ is independently hydrogen, halogen, primary or secondary lower alkyl (e.g., alkyl containing up to 7 carbon atoms), phenyl, haloalkyl, aminoalkyl, hydrocarbonoxy, halohydrocarbonoxy wherein at least two carbon atoms separate the halogen and oxygen atoms, or the like; and each $Q^2$ is independently hydrogen, halogen, primary or secondary lower alkyl, phenyl, haloalkyl, hydrocarbonoxy, halohydrocarbonoxy wherein at least two carbon atoms separate the halogen and oxygen atoms, or the like. Preferably, each $Q^1$ is alkyl or phenyl, especially $C_{1-4}$ alkyl, and each $Q^2$ is hydrogen.

Both homopolymer and copolymer poly(arylene ether) are included. The preferred homopolymers are those containing 2,6-dimethylphenylene ether units. Suitable copolymers include random copolymers containing, for example, such units in combination with 2,3,6-trimethyl-1,4-phenylene ether units or copolymers derived from copolymerization of 2,6-dimethylphenol with 2,3,6-trimethylphenol. Also included are poly(arylene ether) containing moieties prepared by grafting vinyl monomers or polymers such as polystyrenes, as well as coupled poly(arylene ether) in which coupling agents such as low molecular weight polycarbonates, quinones, heterocycles and formals undergo reaction in known manner with the hydroxy groups of two poly(arylene ether) chains to produce a higher molecular weight polymer. Poly(arylene ether)s further include combinations comprising at least one of the above.

The poly(arylene ether) composition utilizes two poly (arylene ether)s. The first poly(arylene ether) resin has an intrinsic viscosity greater than about 0.30 dl/g, as measured in chloroform at 25° C. These polymers generally have more than 50 repeating units of Formula I above and a number average molecular weight within the range of about 3,000 to 40,000 and a weight average molecular weight in the range of 20,000 to 80,000, as determined by gel permeation chromatography. The second poly(arylene ether) resin has an intrinsic viscosity of less than or equal to about 0.17 dl/g, preferably less than or equal to about 0.15 dl/g, and more preferably less than or equal to about 0.13 dl/g, as measured in chloroform at 25° C. The terms first and second as used herein with reference to poly(arylene ether)s are employed simply as identifiers and are not meant to imply or require a particular order of addition. The first and second poly (arylene ether) resins may have the same or different chemical structure.

The poly(arylene ether) are typically prepared by the oxidative coupling of at least one monohydroxyaromatic compound such as 2,6-xylenol or 2,3,6-trimethylphenol. Catalyst systems are generally employed for such coupling; they typically contain at least one heavy metal compound such as a copper, manganese or cobalt compound, usually in combination with various other materials.

Particularly useful poly(arylene ether)s for many purposes are those, which comprise molecules having at least one aminoalkyl-containing end group. The aminoalkyl radical is typically located in an ortho position to the hydroxy group. Products containing such end groups may be obtained by incorporating an appropriate primary or secondary monoamine such as di-n-butylamine or dimethylamine as one of the constituents of the oxidative coupling reaction mixture. Also frequently present are 4-hydroxybiphenyl end groups, typically obtained from reaction mixtures in which a by-product diphenoquinone is present, especially in a copper-halide-secondary or tertiary amine system. A substantial proportion of the polymer molecules, typically constituting as much as about 90% by weight of the polymer, may contain at least one of said aminoalkyl-containing and 4-hydroxybiphenyl end groups.

It will be apparent to those skilled in the art from the foregoing that the contemplated poly(arylene ether) include many of those presently known, irrespective of variations in structural units or ancillary chemical features.

The weight ratio of the first poly(arylene ether) the second poly(arylene ether) in the poly(arylene ether) composition can vary widely and is preferably greater than about 1:1 and more preferably greater than about 1.25:1. Weight ratios of about 1:5 to about 20:1 are even more preferred and ratios of about 9:1 to about 2:1 are most preferred. At high concentrations, the second poly(arylene ether) resin provides brittle materials. Therefore, the second poly(arylene ether) resin is preferably used in an amount of about 40 weight percent (wt %) or less of the total composition, more preferably about 1 to about 30 wt % of the total composition and most preferably about 3 to about 25 wt % of the total composition.

The poly(arylene ether) composition may comprise other components in amounts that vary widely. Most often the combination of first and second poly(arylene ether) is employed in an amount of about 5 to 95 wt % and preferably about 50 to 95 wt % by weight, based on the total weight of the composition. However, compositions comprising 100 wt % poly(arylene ether) are specifically contemplated.

In certain embodiments, the poly(arylene ether) composition may comprise polyamides as disclosed in U.S. Pat.

Nos. 5,981,656 and 5,859,130, polyarylene sulfides as disclosed in U.S. Pat. No. 5,290,881, polyphthalamides as disclosed in U.S. Pat. No. 5,916,970, polyetheramides as disclosed in U.S. Pat. No. 5,231,146, polyesters as disclosed in U.S. Pat. No. 5,237,005, polyetherimides and combinations of the foregoing.

The poly(arylene ether) composition may further comprise additives such as impact modifiers, antioxidants, fillers, conductive fillers (e.g., conductive carbon black, carbon fibers, stainless steel fibers, metal flakes, metal powders, and the like) reinforcing agents (e.g., glass fibers), stabilizers (e.g., oxidative, thermal and ultraviolet stabilizers), antistatic agents, lubricants, colorants, dyes, pigments, drip retardants, and mold release agents.

Materials which enhance the impact strength of the poly (arylene ether) composition (impact modifiers) are not critical but are often desirable. Suitable materials include natural and synthetic elastomeric polymers such as natural rubbers, synthetic rubbers and thermoplastic elastomers. They are typically derived from monomers such as olefins (e.g., ethylene, propylene, 1-butene, 4-methyl-1-pentene) alkenylaromatic monomers, (e.g., styrene and alphamethyl styrene) conjugated dienes (e.g., butadiene, isoprene and chloroprene) and vinylcarboxylic acids and their derivatives (e.g., vinylacetate, acrylic acid, alkylacrylic acid, ethylacrylate, methyl methacrylate acrylonitrile). They may be homopolymers as well as copolymers including random, block, graft and core shell copolymers derived from these various suitable monomers discussed more particularly below.

Polyolefins which can be included within the poly(arylene ether) composition are of the general structure: $C_nH_{2n}$ and include polyethylene, polypropylene and polyisobutylene with preferred homopolymers being polyethylene, LLDPE (linear low density polyethylene), HDPE (high density polyethylene) and MDPE (medium density polyethylene) and isotatic polypropylene. Polyolefin resins of this general structure and methods for their preparation are well known in the art and are described for example in U.S. Pat. Nos. 2,933,480, 3,093,621, 3,211,709, 3,646,168, 3,790,519, 3,884,993, 3,894,999, 4,059,654, 4,166,055 and 4,584,334.

Copolymers of polyolefins may also be used such as copolymers of ethylene and alpha olefins like propylene and 4-methylpentene-1. Copolymers of ethylene and $C_3$–$C_{10}$ monoolefins and non-conjugated dienes, herein referred to as EPDM copolymers, are also suitable. Examples of suitable $C_3$–$C_{10}$ monoolefins for EPDM copolymers include propylene, 1-butene, 2-butene, 1-pentene, 2-pentene, 1-hexene, 2-hexene and 3-hexene. Suitable dienes include 1,4 hexadiene and monocylic and polycyclic dienes. Mole ratios of ethylene to other $C_3$–$C_{10}$ monoolefin monomers can range from 95:5 to 5:95 with diene units being present in the amount of from 0.1 to 10 mol %. EPDM copolymers can be functionalized with an acyl group or electrophilic group for grafting onto the poly(arylene ether) as disclosed in U.S. Pat. No. 5,258,455.

Polyolefins are typically present in an amount from about 0.1% to about 10% by weight based on the total weight of the composition. Where the polyolefin is an EPDM, the amount is generally from 0.25% by weight to about 3% by weight of the composition.

Suitable materials for impact modification include conjugated diene homopolymers and random copolymers. Examples include polybutadiene, butadiene-styrene copolymers, butadiene-acrylate copolymers, isoprene-isobutene copolymers, chlorobutadiene polymers, butadiene acrylonitrile polymers and polyisoprene. These impact modifiers may comprise from about 1 to 30 weight percent of the total composition.

A particularly useful class of impact modifiers with conjugated dienes comprises the AB (di-block), $(AB)_m$—R (di-block) and ABA' (tri-block) block copolymers. Blocks A and A' are typically alkenyl aromatic units and Block B is typically conjugated diene units. For block copolymers of the formula $(AB)_m$—R, integer m is at least 2 and R is a multifunctional coupling agent for the blocks of the structure AB.

Also useful are core shell graft copolymers of alkenylaromatic and conjugated diene compounds. Especially suitable are those comprising styrene blocks and butadiene, isoprene or ethylene-butylene blocks. Suitable conjugated diene blocks include the homopolymers and copolymers described above which may be partially or entirely hydrogenated by known methods, whereupon they may be represented as ethylene-propylene blocks or the like and have properties similar to those of olefin block copolymers. The suitable alkenyl aromatics include styrene, alpha-methyl styrene, para-methyl styrene, vinyl toluene, vinyl xylene and vinyl naphthalene. The block copolymer preferably contains from about 15 to 50% alkenyl aromatic units. Examples of triblock copolymers of this type are polystyrene-polybutadiene-polystyrene (SBS), hydrogenated polystyrene-polybutadiene-polystyrene (SEBS), polystyrene-polyisoprene-polystyrene (SIS) and poly(alpha-methylstyrene)-polyisoprene-poly(alpha-methylstyrene). Examples of commercially available triblock copolymers are the CARIFLEX®, KRATON® D and KRATON® G series from Shell Chemical Company.

Also included are impact modifiers comprising a radial block copolymer of a vinyl aromatic monomer and a conjugated diene monomer. Copolymers of this type generally comprise about 60 to 95 wt % polymerized vinyl aromatic monomer and about 40 to 5 wt % polymerized conjugated diene monomer. The copolymer has at least three polymer chains which form a radial configuration. Each chain terminates in a substantially non-elastic segment, to which the elastic polymer segment is joined. These block copolymers are sometimes referred to as "branched" polymers as described in U.S. Pat. No. 4,097,550 and are used in amounts analogous to other conjugated diene based impact modifiers.

Materials useful in improving the impact strength of the composition are typically employed in amounts of about 2 to about 10 weight percent, based on the total weight of the composition.

It has been found that the advantages of employing low intrinsic viscosity poly(arylene ether) resins as discussed above are also provided in fiber reinforced poly(arylene ether) compositions. Reinforcing agents include fibrous and non-fibrous fillers. The poly(arylene ether) composition may contain fiber reinforcement such as glass fibers which greatly increases the flexural strength, dimensional stability and modulus as well as the tensile strength of the molded composition obtained therewith. In general, lime-aluminum borosilicate glass that is relatively soda-free ("E" glass) is preferred. Although glass roving may be used, cut fibers and milled fibers are often preferred. The length of such cut fibers is usually at least 3 millimeters (mm) and milled fibers would be less than or equal to about 1.5 mm. A preferred length is about 3 mm to about 13 mm. A preferred diameter of the fibers is about 0.002 mm to about 0.015 mm (i.e. 15 micrometers). The amount of glass fiber employed is 0 to about 60% by weight of the total composition and is preferably about 3% to about 30% by weight based on the weight of the entire composition. Larger amounts are used where the end use requires a higher degree of stiffness and strength. More preferably, the amount of glass fiber is about 6% to about 25% by weight based on the weight of the entire composition.

Carbon fibers, carbon fibrils, carbon powder, Kevlar® fibers, stainless steel fibers, and metal coated graphite fibers can also be employed at levels of 0 to abut 60 wt %, preferably about 1.5 to about 25 wt %, more preferably about 3% to about 15% by weight. Carbon fibers typically have a length of at least 3 mm, preferably about 3 mm to about 13 mm. Samples of metal used to coat the graphite fibers include nickel, silver, brass, copper and gold, with nickel being preferred. Fibers and platelets of metals such as aluminum, nickel, iron and bronze are also suitable in amounts up to about 60 wt % based on the entire weight of the composition.

Suitable non-fiberous inorganic fillers include mica, clay, glass beads, glass flakes, graphite, aluminum hydrate, calcium carbonate, silica, kaolin, barium sulfate, talcum and calcium silicate (wollastonite). Effective amounts will differ according to the particular agent used, but they are generally about 0.25% to about 60 wt %, more typically about 1 to about 30 wt % and preferably about 3% to about 12% by weight based on the weight of the entire composition. Examples of mica include muscovite, phlogopite, biotite, fluorophlogopite, and synthetic mica. When utilized, the levels of mica are preferably about 0.25% to about 30% by weight, based on the weight of the entire composition. When utilized, the preferred amounts of clay are about 0.25% to about 30% by weight, based on the weight of the entire composition.

Suitable pigments include those well known in the art such as titanium dioxide ($TiO_2$), and carbon black. Suitable stabilizers include zinc sulfide, zinc oxide and magnesium oxide.

Suitable antioxidants include, but are not limited to, hydroxyl amines, hindered phenols such as alkylated monophenols and polyphenols, benzofuranones such as 3 aryl benzolfuranone, alkyl and aryl phosphites such as 2,4-di-tert butyl phenol phosphite and tridecyl phosphite, and hindered amines such as dioctyl methylamine oxide and other tertiary amine oxides. Such antioxidants are preferably used in an amount of 0.1 to 1.5 wt %, based on the weight of the composition.

Suitable U.V. stabilizers include 4,6-dibenzoyl resorcinols, alkanol amine morpholenes and benzotriazole.

The poly(arylene ether) composition may be prepared by well known procedures. An example of a method of preparation is to first dry blend the first and second poly(aryelene ether)s and compound the mixture by known techniques such as within an extruder to form the poly(arylene ether) composition. Additional components such as fillers may be added with the poly(arylene ethers) or added at a subsequent mixing or compounding step. The poly(arylene ether) composition has lower melt viscosity while giving higher HDT values and impact properties when compared to previously known poly(arylene ether) compositions containing plasticizer. The poly(arylene ether) composition can be blended with other components or extruded, quenched and chopped into pellets. These pellets can then be melted and molded into articles of desired shape and size or compounded again to blend with other components before additional processing in preparing finished articles.

The poly(arylene ether) composition is particularly useful in the formation of electronic packaging handling systems such as integrated circuit trays and head gimbal assembly trays. Materials employed in electronic packaging handling systems require excellent dimensional stability, particularly at temperatures greater than about 130° C. and in some applications at temperatures greater than or equal to about 150° C.

The invention is further illustrated by the following non-limiting examples.

EXAMPLES 1–6

Figure 2:
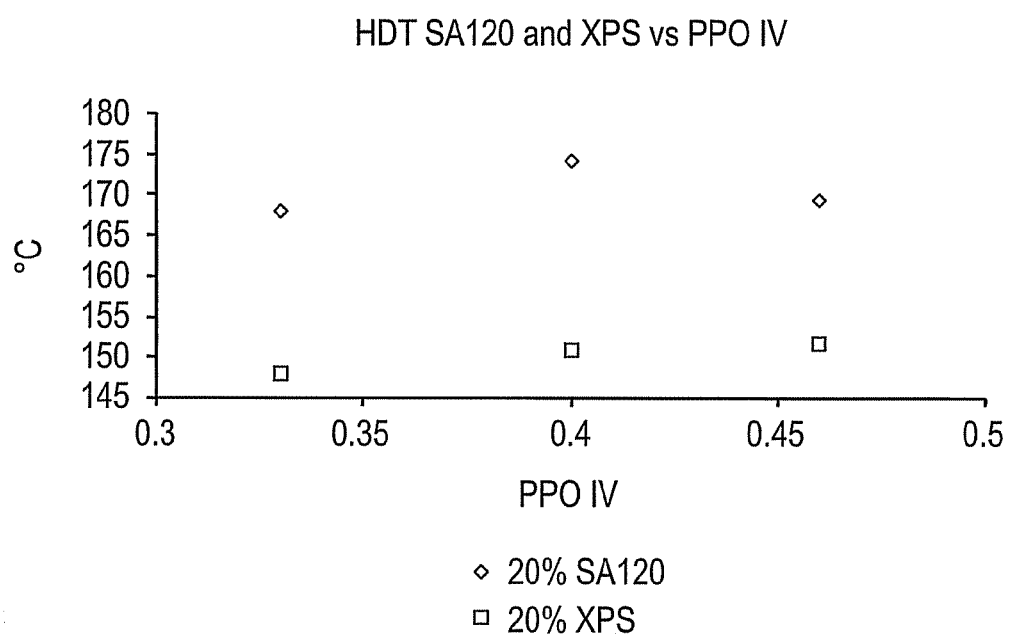
FIG. 2 is a graph depicting heat deflection temperature data.

SA120, apoly(arylene ether) having an intrinsic viscosity of 0.12 g/dl measured in chloroform at 25° C. was obtained from GE Plastics in pellet form and ground to reduce the particle size. 20 wt % ground SA120 was then melt blended with 80 wt % of higher intrinsic viscosity poly(arylene ether) (as shown in Table 2). The comparative examples employ 20 wt % crystal polystyrene (XPS) employed as a flow promoter/plasticizer. The melt viscosity of the examples was measured by multipoint capillary rheometry on a Kayeness Rheometer at 340° C. using a 4 minute dwell time. Values for the shear rate are in reciprocal seconds and for melt viscosity are in Pascal-seconds. The data is shown in FIG. 1 and Table 2. FIG. 1 demonstrates the remarkably similar viscosity between compositions containing low intrinsic viscosity poly(arylene ether) (SA120) and comparable compositions containing a polystyrene plasticizer. The heat deflection temperature (in ° C.) was measured at 264 psi using ASTM D648 and the data is shown in FIG. 2.

TABLE 1

|  | Example | | | | | |
| --- | --- | --- | --- | --- | --- | --- |
|  | 1 | 2 | 3 | 4* | 5* | 6* |
| SA120 | X | X | X |  |  |  |
| XPS |  |  |  | X | X | X |
| Polyarylene ether (IV-0.30) | X |  |  | X |  |  |
| Polyarylene ether (IV = 0.40) |  | X |  |  | X |  |
| Polyarylene (IV = 0.46) |  |  | X |  |  | X |

*Comparative examples

TABLE 2

| Shear | 1 | 2 | 3 | 4* | 5* | 6* |
| --- | --- | --- | --- | --- | --- | --- |
| 48.6 | 367 | 999 | 1344 | 381 | 886 | 1114 |
| 97.3 | 347 | 816 | 1001 | 333 | 741 | 918 |
| 255.4 | 278 | 585 | 675 | 285 | 526 | 613 |
| 498.6 | 245 | 439 | 489 | 237 | 374 | 449 |
| 754 | 209 | 362 | 402 | 207 | 321 | 362 |
| 997.2 | 192 | 314 | 344 | 186 | 268 | 313 |
| 1495.8 | 164 | 255 | 276 | 155 | 215 | 254 |
| 1994.5 | 144 | 217 | 237 | 135 | 182 | 215 |
| 2505.2 | 129 | 190 | 207 | 121 | 172 | 188 |

*Comparative examples

As seen in FIG. 1 and Table 2 the compositions containing the low intrinsic viscosity poly(arylene ether) (SA120) exhibit equivalent melt viscosity without the use of a plasticizer than comparable compositions containing polystyrene. FIG. 2 demonstrates that compositions containing low intrinsic viscosity poly(arylene ether) exhibit significantly greater heat deflection temperatures than comparable compositions employing a flow promoter/plasticizer.

EXAMPLES 7–16

Examples 7–16 were prepared in the same manner as Examples 1–6. Examples 7–12 employ a high heat poly (arylene ether) that has an intrinsic viscosity of 0.33 g/dl measured in chloroform at 25° C. The amount of SA120 and crystal polystyrene in the compositions was varied as shown in Table 3. The compositions were tested heat deflection temperature as described above. The melt viscosity of the examples was measured by multipoint capillary rheometry on a Kayeness Rheometer at 340° C. using a 4 minute dwell time. Values for the shear rate are in reciprocal seconds and for melt viscosity are in Pascal-seconds. The data is shown in Tables 3 and 4 and FIG. 3. Amounts of the components are shown in weight percent, based on the total weight of the composition.

TABLE 3

| Example | 0.33 IV PPO | SA120 | HH PPO | XPS | HDT(in ° C.) |
|---|---|---|---|---|---|
| 7 | — | 5 | 95 | — | 185 |
| 8 | — | 10 | 90 | — | 184 |
| 9 | — | 15 | 85 | — | 181 |
| 10 | — | 20 | 80 | — | 177 |
| 11* | — | — | 95 | 5 | 177 |
| 12* | — | — | 85 | 15 | 166 |
| 13 | 90 | 10 | — | — | 180 |
| 14 | 90 | 10 | — | — | 179 |
| 15 | 95 | 5 | — | — | 182 |
| 16* | 95 | — | — | 5 | 177 |

*Comparative examples heat deflection temperature while exhibiting a similar melt viscosity to compositions containing crystal polystyrene.

EXAMPLES 17–23

Examples 17–23 employ the materials described above as well as 0.5 parts by weight polyethylene, 11 parts by weight glass fiber, and 7 parts by weight carbon fiber, wherein the parts by weight are based on 100 parts of poly(arylene ether). The glass fiber employed is available under the trade name 122Y-14P from Owens Corning. The carbon fiber employed is available under the trade name Fortafil 202 from Akzo. The polyethylene was employed as a mold release agent and is available under the trade name G12024A from Novapol.

The compositions of the Examples 17–23 are shown in Table 4. The examples were tested for mold transfer pressure using a standard shot size, transfer position and injection speed. The examples were tested for heat deflection temperature at 264 psi and 66 psi according to ASTM D648, tensile strength according to ASTM D638, flex modulus according to ASTM D790, notched Izod according to ASTM D256, unnotched Izod according to ASTM D4812, and melt viscosity using multipoint capillary rheometry. Heat deflection temperatures are in ° C. Tensile strength, mold transfer pressure, and flexural modulus are in megapascals (mpa).

TABLE 4

| Shear | 7 | 8 | 9 | 10 | 11* | 12* | 13 | 14 | 15 | 16* |
|---|---|---|---|---|---|---|---|---|---|---|
| 97.3 | 605.8 | 521.9 | 464.5 | 348.6 | 623.5 | 414.3 | 247.9 | 203.6 | 263.8 | 242.6 |
| 206.7 | 467.3 | 421.2 | 373.9 | 287.1 | 492.4 | 340.1 | 209.1 | 192.5 | 238.3 | 223.3 |
| 304 | 425.2 | 380.5 | 335.2 | 253.8 | 446.2 | 303 | 189.2 | 174.5 | 213.6 | 206.2 |
| 498.6 | 348 | 314.3 | 283.8 | 222.8 | 368.5 | 259.3 | 168.6 | 157.9 | 191.7 | 184.5 |
| 705.4 | 300.4 | 278.8 | 246.1 | 195.7 | 315.3 | 223.9 | 150.9 | 145.1 | 173.9 | 168 |
| 997.2 | 256.8 | 232.7 | 214.7 | 171.4 | 270.4 | 193.7 | 139.1 | 133 | 158.1 | 154.4 |
| 1495.8 | 214.7 | 199.5 | 185 | 145.7 | 227.2 | 163.7 | 122.8 | 120.1 | 141.3 | 132.2 |
| 1994.5 | 191.3 | 179.6 | 160.4 | 129.1 | 200.3 | 144.32 | 109.3 | 108 | 124 | 119.9 |
| 2505.2 | 171.1 | 164.2 | 143.8 | 116 | 183.4 | 127.9 | 99 | 98.2 | 113.2 | 107.7 |
| 3003.8 | 159.4 | 152 | 133.1 | 106.7 | 168.8 | 118.7 | 92.9 | 92.2 | 105.2 | 101.3 |

*Comparative examples

Figure 3:
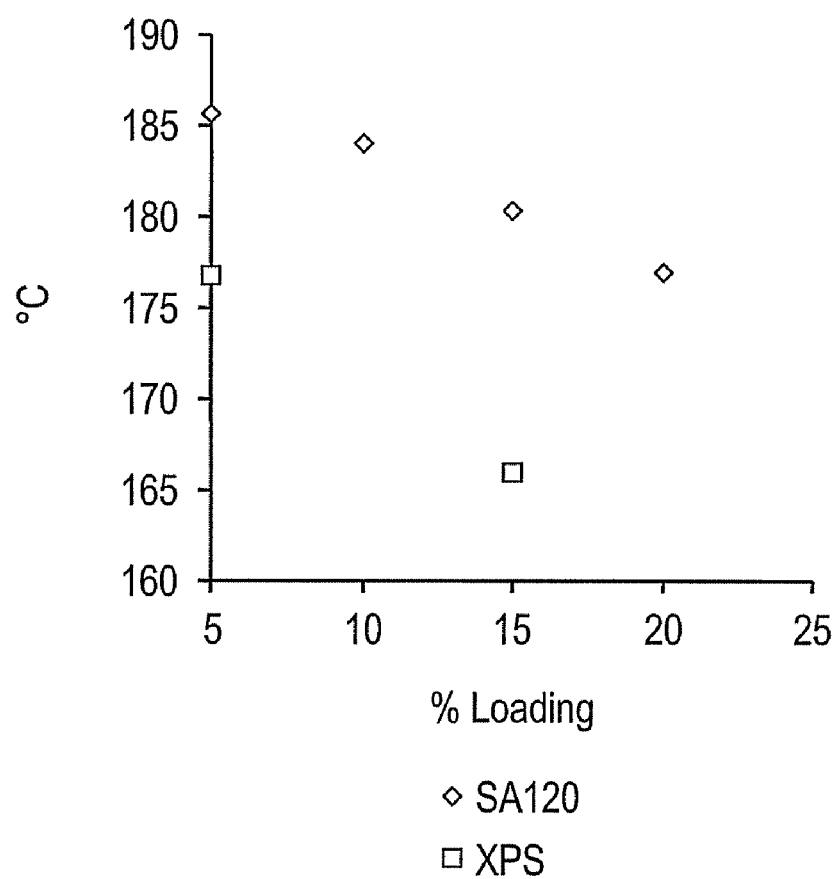
FIG. 3 is a graph depicting heat deflection temperature data.

As can be seen in Tables 3 and 4 and FIG. 3 the replacement of crystal polystyrene with low intrinsic viscosity poly(arylene ether) results in a marked increase in Notched and unnotched Izod values are in kilojoules per square meter (kj/m²). Data for Examples 17–23 is shown in Table 5 and in FIGS. 4 and 5.

TABLE 5

| Ex | HH PPO | 0.33 dl/g poly(arylene ether) | SA120 | XPS | Mold transfer pressure | HDT (264 psi, ° C.) | HDT (66 psi, ° C.) | Tensile strength | Flex Mod | Notched Izod | Unnotched Izod |
|---|---|---|---|---|---|---|---|---|---|---|---|
| 17* | — | 80 | — | 20 | 4.6 | 172 | 178 | 91 | 8176 | 4.0 | 22.1 |
| 18 | — | 80 | 20 | — | 4.7 | 193 | 199 | 90 | 7762 | 4.1 | 29.0 |
| 19 | — | 90 | 10 | — | 6.1 | 198 | 205 | 87 | 7597 | 4.5 | 24.8 |
| 20 | 90 | — | 10 | — | 12.1 | 202 | 204 | 96 | 7849 | 5.1 | 27.9 |
| 21 | 80 | — | 20 | — | 10.2 | 199 | 208 | 88 | 7693 | 3.8 | 27.9 |
| 22 | — | 70 | 30 | — | — | 179 | — | — | 7723 | 3.9 | — |
| 23 | — | 60 | 40 | — | — | — | — | 84 | 7865 | 3.9 | — |

*Comparative examples

Figure 4:
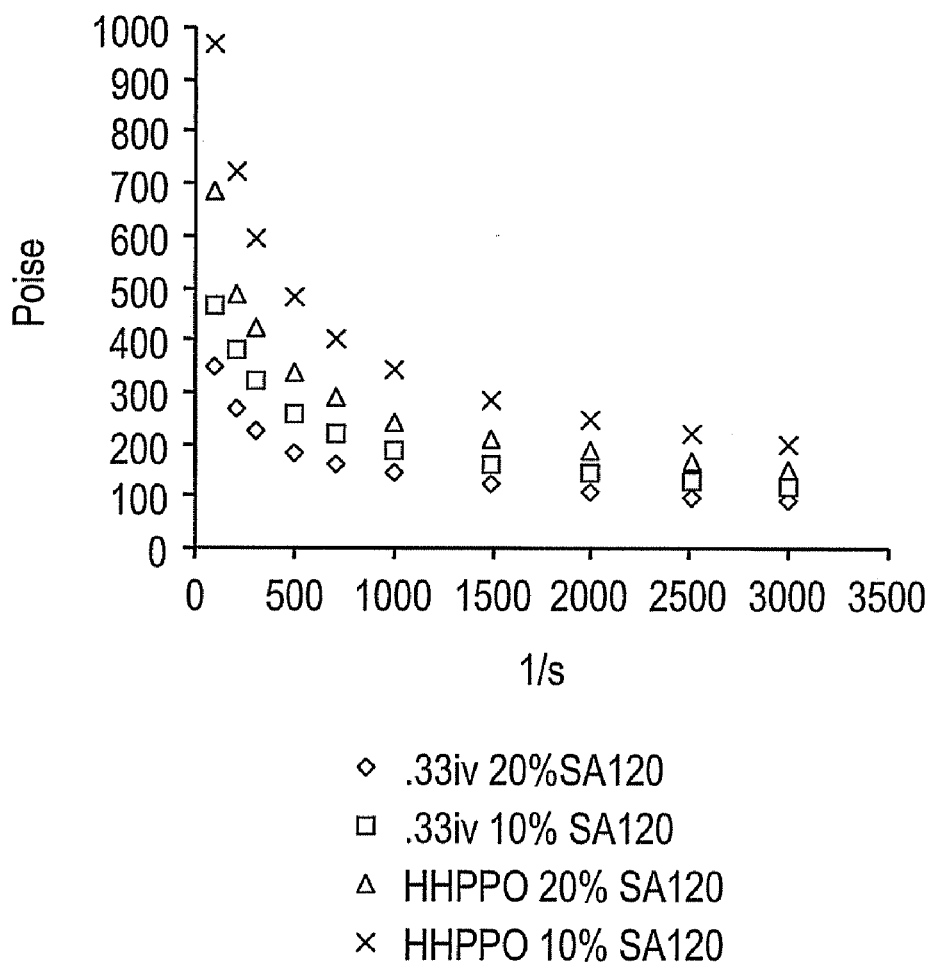
FIG. 4 is a graph depicting melt viscosity data.
Figure 5:
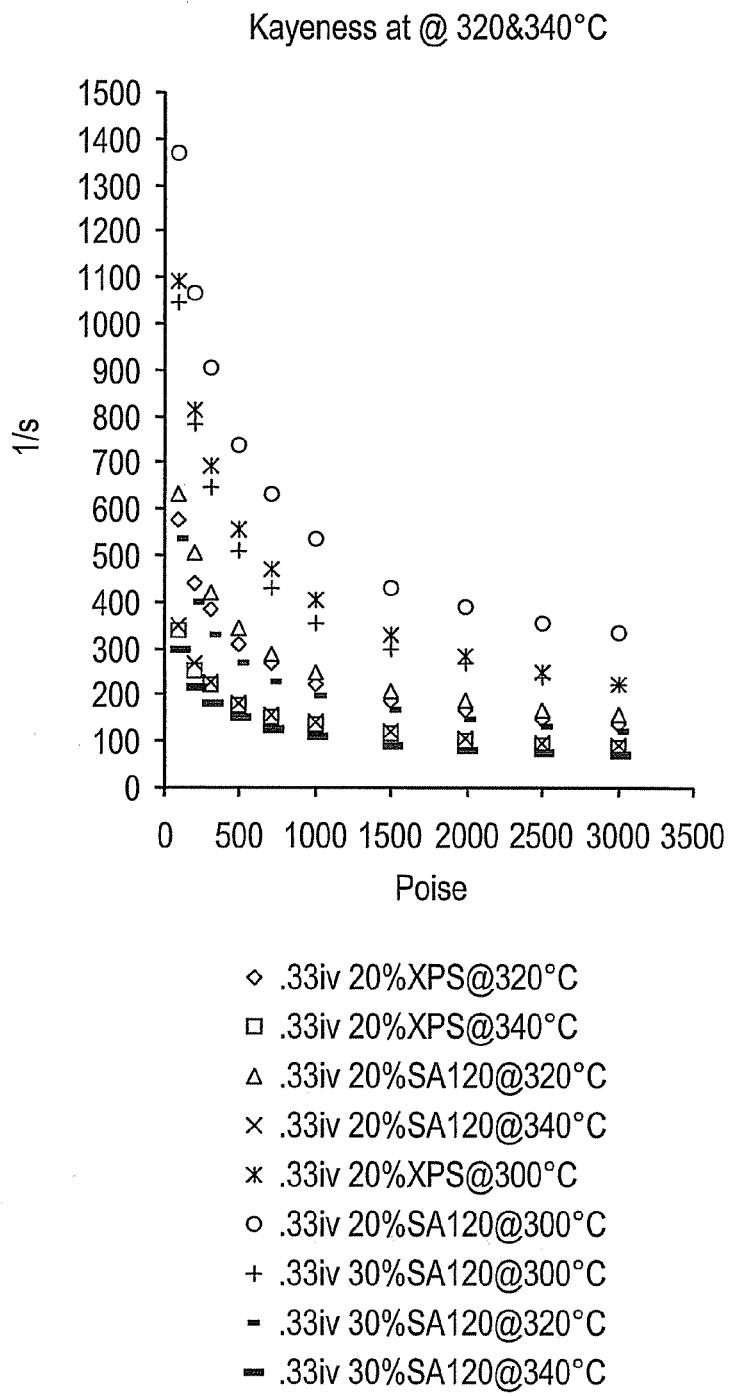
FIG. 5 is a graph depicting melt viscosity data.

As can be seen from Table 4 and FIGS. 4 and 5 the replacement of polystyrene with low intrinsic viscosity poly(arylene ether) in filled compositions yields a unique combination of properties, namely melt viscosity similar to the melt viscosity of the polystyrene containing composition and a heat deflection temperature significantly higher than the polystyrene containing compositions.

EXAMPLES 24–38

SA120, a poly(arylene ether) having an intrinsic viscosity of 0.12 g/dl measured in chloroform at 25° C. was obtained from GE Plastics in pellet form and ground to reduce the particle size. The ground SA120 was melt blended with a poly(arylene ether) (PPO) having an intrinsic bisphenol A diphosphate (BPADP) in the amounts shown in Table 6. All amounts are in weight percent based on the composition total weight. The melt viscosity of the examples was measured by multipoint capillary rheometry on a Kayeness Rheometer at 300° C. using a 4 minute dwell time. Values for the shear rate are in reciprocal seconds and for melt viscosity in Pascal-seconds. The examples were tested for heat deflection temperature at 264 psi according to ASTM D648, tensile strength according to ASTM D638 and flex modulus according to ASTM D790. The data is shown in Table 6. Heat deflection temperature values are in ° C. Tensile yield strength values are in kilogram-force/square centimeter (kgf/cm$^2$). Crosshead breaks elongation is in percent. Flexual modulus and flexural yield strength values are in kgf/cm$^2$.

As can be seen by the melt viscosity and heat deflection of examples 24–36 the introduction of BPADP significantly lowers the melt viscosity and the heat deflection temperature. In contrast similar compositions, examples 37 and 38, without the BPADP surprisingly exhibit good melt viscosity and higher heat deflection temperature.

While the invention has been described with reference to various embodiments, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

All cited patents and other references are incorporated herein by reference in their entirety.

The invention claimed is:

1. A poly(arylene ether) composition comprising a first poly(arylene ether) resin having an intrinsic viscosity greater than or equal to about 0.3 dl/g, as measured in chloroform at 25° C. and a second poly(arylene ether) resin having an intrinsic viscosity less than or equal to about 0.17 dl/g, as measured in chloroform at 250° C.

wherein the composition is a thermoplastic composition essentially free of plasticizers, and

TABLE 6

|  | 24* | 25* | 26* | 27* | 28* | 29* | 30* | 31* |
|---|---|---|---|---|---|---|---|---|
| PPO | 69.5 | 78.5 | 66 | 82 | 57 | 66 | 61.5 | 86.5 |
| SA120 | 17.5 | 17.5 | 30 | 5 | 30 | 30 | 30 | 5 |
| BPADP | 13 | 4 | 4 | 13 | 13 | 4 | 8.5 | 8.5 |
| Flexural Modulus | 29880 | 28550 | 28634 | 28519 | 28288 | 28129 | 29009 | 28806 |
| Flexural Yield Strength | 668 | 928 | 817 | 13178 | 337 | 813 | 555 | 1301 |
| Heat Deflection Temperature | 128 | 162 | 156 | 134 | 123 | 155 | 140 | 151 |
| Tensile Yield Strength | 463 | 625 | 534 | 812 | 268 | 440 | 365 | 788 |
| Crosshead Break Elongation | 3.75 | 5.40 | 4.81 | 7.83 | 2.03 | 3.84 | 2.99 | 7.82 |
| Shear = 1496 | 113 | 258.8 | 164 | 176.7 | 65.8 | 156.9 | 102.6 | 260.8 |

|  | 32* | 33* | 34* | 35* | 36* | 37 | 38 |
|---|---|---|---|---|---|---|---|
| PPO | 80.25 | 67.75 | 91 | 82 | 57 | 80 | 70 |
| SA120 | 11.25 | 23.75 | 5 | 5 | 30 | 20 | 30 |
| BPADP | 8.5 | 8.5 | 4 | 13 | 13 | — | — |
| Flexural Modulus | 28258 | 28994 | 27321 | 28388 | 28600 | 26838 | 27573 |
| Flexural Yield Strength | 1292 | 600 | 1263 | 1320 | 375 | 1155 | 832 |
| Heat Deflection Temperature | 146 | 142 | 150 | 132 | 123 | 172 | 167 |
| Tensile Yield Strength | 796 | 651 | 723 | 794 | 279 | 771 | 258 |
| Crosshead Break Elongation | 7.98 | 5.58 | 7.02 | 7.68 | 2.13 | 8.32 | 2.93 |
| Shear = 1496 | 210.5 | 127.4 | 298.6 | 160.2 | 63.5 | 330 | 234.9 |

*Comparative Examples wherein the composition has a melt viscosity less than or equal to about 190 Pascal-seconds at 1500 seconds$^{-1}$ and a temperature of 320° C. in the absence of filler.

2. The composition of claim 1, wherein the second poly(arylene ether) resin has an intrinsic viscosity less than or equal to about 0.15 dl/g as measured in chloroform at 25° C.

3. The composition of claim 1, wherein the second poly(arylene ether) resin has an intrinsic viscosity less than or equal to about 0.13 dl/g as measured in chloroform at 25° C.

4. The composition of claim 1, wherein the ratio of the first poly(arylene ether) resin to the second poly(arylene ether) resin is greater than 1:1.

5. The composition of claim 1, wherein the ratio of the first poly(arylene ether) resin to the second poly(arylene ether) resin is 1.5:1 to 20:1.

6. The composition of claim 1, wherein the composition further comprises a reinforcing agent.

7. The composition of claim 6, wherein the reinforcing agent comprises glass fiber.

8. The composition of claim 6, wherein the reinforcing agent comprises carbon fiber.

9. The composition of claim 6, wherein the reinforcing agent comprises non-fibrous inorganic filler.

10. The composition of claim 6, wherein the composition has a melt less than or equal to about 270 Pascal-seconds at 1500 seconds$^{-1}$ and a temperature of 320° C. measured in the presence of the reinforcing agent.

11. The composition of claim 1, wherein the composition has a heat deflection temperature greater than or equal to about 130° C. as determined by ASTM D648.

12. The composition of claim 1, wherein the composition has a dissipation factor of less than or equal to about 0.02 as measured according to ASTM D150 at 25° C. and 1 kilohertz, 10 kilohertz, 100 kilohertz or 1 megahertz.

13. The composition of claim 1 further comprising an impact modifier.

14. An article comprising the composition of claim 1.

15. A polyarylene ether composition consisting essentially of a first poly(arylene ether) resin having an intrinsic viscosity greater than or equal to about 0.3 dl/g, as measured in chloroform at 25° C. and a second poly(arylene ether) resin having an intrinsic viscosity less than or equal to about 0.13 dl/g, as measured in chloroform at 25° C. wherein the composition is a thermoplastic composition, and wherein the composition has a melt viscosity less than or equal to about 190 Pascal-seconds at 1500 seconds$^{-1}$ and a temperature of 320° C.

16. An article comprising the composition of claim 15.

17. A polyarylene ether composition consisting essentially of a first poly(arylene ether) resin having an intrinsic viscosity greater than or equal to about 0.3 dl/g, as measured in chloroform at 25° C.; a second viscosity poly(arylene ether) resin having an intrinsic viscosity less than or equal to about 0.3 dl/g, as measured in chloroform at 25° C.; and a reinforcing agent
 wherein the composition is a thermoplastic composition, and
 wherein the composition has a melt viscosity less than or equal to about 270 Pascal-seconds at 1500 seconds$^{-1}$ and a temperature of 320° C.

18. An article comprising the composition of claim 17.

19. The article of claim 18 wherein the article is part of an electronic packaging handling system.

* * * * *

UNITED STATES PATENT AND TRADEMARK OFFICE
CERTIFICATE OF CORRECTION

PATENT NO. : 7,183,350 B2 Page 1 of 1
APPLICATION NO. : 10/777436
DATED : February 27, 2007
INVENTOR(S) : Kim Balfour et al.

It is certified that error appears in the above-identified patent and that said Letters Patent is hereby corrected as shown below:

Column 8:
Line 12, after "SA120", delete "apoly" and insert therefor --a poly--;

Column 14:
Line 22, before "dl/g", delete "0.3" and insert therefor --0.13--.

Signed and Sealed this

Third Day of July, 2007

JON W. DUDAS
*Director of the United States Patent and Trademark Office*